United States Patent Office 3,249,503
Patented May 3, 1966

3,249,503
EUPHORIANT
Jane Frances Emele, Morris Plains, N.J., and Wilson B. Lutz, North Manchester, Ind., assignors to Warner-Lambert Pharmaceutical Company, Morris Plains, N.J., a corporation of Delaware
No Drawing. Filed Oct. 22, 1963, Ser. No. 318,095
1 Claim. (Cl. 167—65)

This invention relates to a novel composition of matter. More particularly, this invention relates to new and novel therapeutic compositions containing 2-dimethylaminopyrazine and the corresponding nontoxic pharmaceutically acceptable acid addition salts which when administered in suitable dosage form act to produce an effective degree of euphoria.

Within the last decade, there has been noted a rapid introduction of psychopharmacologic agents which act on the nervous system directly or indirectly to affect the mental and emotional processes. In the light of their observed action, these agents generally have been classed as tranquilizers or as antidepressants.

The tranquilizers produce emotional calmness and/or muscular relaxation and are useful to control anxiety, psychomotor agitation and related symptoms. These chemotherapeutic tranquilizer agents are represented by the phenothiazines such as mepazine, chlorpromazine, rauwolfia derivatives such as reserpine, rescinnamie, the diolcarbamates such as meprobamate, phenaglycodol and the benzodiazepines such as chlordiazepoxide.

The antidepressant drugs on the other hand generally act by stimulating the nervous system resulting in an increase in alertness and thus reducing the depression. They are primarily used in the treatment of psychiatric depression. They include, for example, direct stimulants such as the amphetamines and monoamine oxidase (MAO) inhibitors such as phenelzine, nialamide and the like.

It is evident from the foregoing discussion that the tranquilizers relax and the antidepressants stimulate emotional processes. However, most of these agents lack the property of producing a sense of well-being which is obvious quite desirable in many psychotic disorders. For example, schizophrenics will be greatly benefited by a drug which can improve their innate lack of capacity for adaptability or sociability. Furthermore, many of these psychopharmacologic agents do possess an observable degree of toxicity and the resulting side-effects limit their uses. For example, the phenothiazines cannot be tolerated by epileptics because of their convulsant properties. The rauwolfia derivatives produce gastric hypersecretion and certain of the MAO inhibitors, on the other hand, have been known to produce liver damage. Clearly, there is a need for pyschotherapeutic compositions which are relatively nontoxic but are capable of producing a sense of well-being or euphoria in addition to clinically effective tranquilizing activity.

Accordingly, a primary object of this invention is to provide a therapeutic composition which is capable of producing tranquility coupled with euphoria.

A further object of this invention is to provide a therapeutic composition which is capable of producing subtle behavioral changes, including enhanced sociability, adaptability and the like.

Yet another object of this invention is to provide an euphoriant composition which is relatively nontoxic.

Other objects of this invention will become more apparent from the following detailed description.

We have now found that 2-dimethylaminopyrazine of the formula:

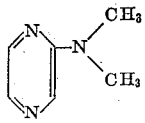

as the free base or in the form of its salts is capable of producing euphoria accompanied by certain very desirable behavior changes thus providing a unique psychopharmacologic agent. This finding is quite surprising since 2-dimethylaminopyrazine is chemically unrelated to any of the known psychopharmacologic agents.

Broadly speaking, 2-dimethylaminopyrazine has been found to produce depression of the spinal cord and muscle relaxation in mammals such as cats and rats properties which, of course, are highly desirable in a tranquilizer. But, in addition, a subtle but quite distinct behavioral effect has also been found following administration of the drug to cats. This effect is manifested by a marked increase in contentment and socialability. Thus, for example, cats which in new, strange and unfamiliar surroundings exhibit a belligerent and unfriendly attitude toward their keeper undergo a quite remarkable behavioral change after the administration of the euphoriant composition of this invention at a dose of 50 mg. per kilogram body weight. The drug-induced change in behavior permits the keeper to do anything to the cat—pull its ear, its whiskers, put it in any bizarret position and even hold it upside down by its hind legs. On the other hand, untreated control cats even though well adapted to the environment cannot tolerate these manipulations.

The compound 2-dimethylaminopyrazine has also been found to produce sedation and muscle relaxation and to antagonize the pharmacological actions of morphine, lysergic acid and tremorine in certain warm-blooded mammals such as cats and dogs. In addition, its antagonistic action is most effectively demonstrated in natural and induced aggressions in cats and rats.

The above compound is obtained by reacting the intermediate 2-chloropyrazine with dimethylamine. The 2-chloropyrazine is disclosed, for example, by G. Karmas et al., J. Am. Chem. Soc., 74, 1580 (1952). A reaction mixture comprising one part 2-chloropyrazine and about 1.5 to 2 parts by weight of dimethylamine is allowed to react at ambient temperature such as 20°–30° C. for about 48 hours. An alkali metal hydroxide, for example, potassium hydroxide may also be present in the mixture. The reaction product is then recovered by extraction. The 2-dimethylaminopyrazine base may also be converted into its pharmaceutically acceptable nontoxic acid addition salts. Typical salts are, for example, those formed with maleic, fumaric, succinic, citric, acetic, sulfumic, cyclohexyl sulfamic, sulfuric, hydrochloride, hydrobromide, phosphoric, nitric and the like. These salts are prepared, for example, by reacting a solution of the free base in an organic solvent such as ethyl ether, ethanol and ethylacetate with the selected acid in equi-molar ratios. The desired salt being water soluble is recovered by aqueous extraction of the reaction mixture.

For therapeutic use, the compounds of this invention either as the free base or in the form of a salt may be combined with pharmaceutical carriers to provide such dosage forms as tablets, capsules, solutions, suspensions, suppositories, elixirs and the like. In the treatment of mental depression, for example, a dose of 100 to 200 mg. daily is generally sufficient.

The following examples are included in order further to illustrate the invention.

*Example 1.—2-dimethylaminopyrazine and 2-dimethylaminopyrazine hydrochloride*

A mixture of 4 grams 2-chloropyrazine (.0345 mol) and 10 ml. dimethylamine (.015 mol) in a Carius tube is kept for 48–60 hours at 20°–30° C. The mixture is cooled in an ice bath and the tube opened. The excess amine is permitted to evaporate. The residue is treated with 10 ml. of 10M aqueous KOH and the product extracted with ether. The ether is dried over anhydrous potassium carbonate and then evaporated to obtain 2-dimethylpyrazine free base, in the form of an oil. The colored oily residue is dissolved in 50 ml. of ethyl acetate and the solution treated with anhydrous HCl at 20°–30° C. The 6 g. of crude salt which precipitates is recrystallized from ethanol-ether affording 3.8 g. (69%) of 2-dimethylaminopyrazine hydrochloride as a yellow crystalline salt, M.P. 184.2°–185.8° C. A portion sublimed at .02 mm. and 55° C. gives an analytical sample, M.P. 185.2°–186.2° C.

*Analysis.*—Calc.: C 45.14, H 6.31, Cl⁻ 22.22. Found: C 45.00, H 6.53, Cl⁻ 22.02, 21.19.

*Example 2*

25 parts of 2-dimethylaminopyrazine are mixed with 75 parts of milk sugar. The mixture is then filled into #1 hard gelatin capsules at 100 mg. each. Each capsule contains 25 mg. of the active ingredient.

In order to further elucidate the drug's pharmacological activity and to demonstrate its unique properties, the following studies and the results are also included.

*Example 3.—Behavioral activity in normal cats*

2-dimethylaminopyrazine hydrochloride is studied for behavioral effects in healthy, normal, adults cats. The cats are housed individually in cages during the study. They are observed closely for six hours after drug administration and then at 24 hours or for as long as drug activity is evident. The drugs are administered orally in gelatin capsules and/or intravenously (i.v.). The following parameters of behavior are studied.

Sociability:
    Response to investigator; comes to front of cage when investigator approaches, follows investigator when animal is put on the floor
    Mewing
    Pleasure response to petting
    Alert; interested in new objects introduced into cage
    Playful
    Does not run away from investigator when taken out of cage
    Absence of startle response
Contentment:
    Washing
    Kneading
    Purring
    Rubbing (against cage, investigator, or any objects)
    Sitting quietly, usually with front paws knuckled under body
    Sleeping (crouched or outstretched)
    Claws not extended when being handled
Excitement:
    Yowling
    Lashing tail
    Piloerection
    Mydriasis
    Pacing
Hostility:
    Growling
    Hissing
    Flattening of ears
    Withdrawal from observer
    Attacking
    Spitting
    Claws unsheathed Indifference
Disorientation
Hallucinations
Sedation
Ataxia
Motor apraxia
Scratching
Salivation
Retching
Emesis
Urination
Defecation
Diarrhea
Miosis
Polydypsia
Relaxation of nictitating membranes
Respiratory effects
Anorexia or hyperphagia
Tremors
Paralysis:
    Flaccid
    Spastic
Convulsions:
    Clonic
    Tonic
Lacrimation
Death The predominant effect of 2-dimethylaminopyrazine hydrochloride is the marked increase in both contentment and sociability. This effect is observed especially in cats which are new arrivals in the animal quarters and which are apprehensive, withdrawn, and do not respond to attention and petting. Those cats which had been associated with the laboratory and had been handled a great deal in behavioral studies do not react as well to the drug because behaviorally they exhibit all of the characteristics which comprised "contentment" and "sociability" and it is difficult to observe increases in the degree of these behavioral patterns. In this "well adjusted" type of animal, the response to 2-dimethylaminopyrazine hydrochloride is sometimes manifested by a decrease in motor activity.

Results:

| | |
|---|---|
| 25 to 100 mg./kg. orally | Marked increase in contentment and sociability. In some cats, polydypsia and sneezing. |
| 200 mg./kg. orally | Increase in contentment and sociability, ataxia, retching, anorexia, decreased motor activity. |
| 25 mg./kg. i.v. | Increase in contentment and sociability. |
| 50 mg./kg. i.v. | Initial, transient (less than 2 minutes) flaccid paralysis, ataxia, sneezing, anorexia. |
| 75 mg./i.v. | Immediate flaccid paralysis (lasting less than 2 minutes), marked increase in contentment and sociability, anorexia. |
| 150 mg./kg. i.v. | Marked increase in contentment and sociability, transiet flaccid paralysis, marked ataxia, lasting 6 hours, cat normal at 24 hours. |

*Example 4.—Behavioral effect in kittens*

Pairs of litter mates which have been constantly housed together in a single cage and during the experimental periods are put in an experimental cage, 9 feet by 3 feet, which contains various objects with which they play, climb over, hide behind, etc. The kittens are put in this cage for one hour each day whether or not they have received a drug. Therefore, the environment is familiar to them and they adopt specific behavioral patterns to it. The natural behavior activity of kittens is dynamic; they continually play with inanimate objects or each other, they climb the wire sides of the cage, and they respond to the investigator. Their activity is spontaneous and careful study of each kitten reveals that each has an individual behavioral pattern.

In studying drugs, either one or both of the kittens in a pair would receive the drug. When the kittens are very young, the drugs are injected intraperitoneally but after they were 4 to 5 months old the drugs were administered in gelatin capsules. The kittens were closely observed for 6 hours and then at 24 hours, or for the duration of action of the drug. Each pair of kittens was used only once very two weeks. The same parameters of behavior were used as with the adult cats, with additions such as effects in playing together, playing with specific objects, muscle tone and coordination in climbing, running, jumping, and the effect of introducing a foreign kitten into the environment.

The results are presented in the table below.

| Drug | Dosage Range, mg./kg. | Behavioral Effects |
|---|---|---|
| 2-dimethylaminopyrazine hydrochloride | 25 | Sedation lasting 3 days. |

*Example 5.—Antagonism to morphine-induced rage in cats*

That cats react idiosyncratically to the administration of morphine has been established. This reaction, a rage phenomenon, is dosage dependent and is characterized by hissing, pacing, mydriasis, piloerection, yowling, ataxia, attacking, emesis, salivation, and death. This pattern is reproducible and therefore the effects of the potentially antagonistic effect on each of these parameters is studied.

The drugs to be studied are administered in gelatin capsules to cats 30 minutes prior to the intraperitoneal administration of 20 mg./kg. of morphine sulfate. The animals are housed separately and are closely observed for 6 hours and then at 24 hours, after which time the animal is sacrified. The effects of these drugs are compared with those of chlorpromazine, meprobamate, and imipramine.

2-dimethylaminopyrazine hydrochloride administered orally at 50 mg./kg., antagonizes all of the morphine effects except the pacing and mydriasis.

Of the three standard reference agents, the combination of morphine and imipramine, 25 mg./kg., produced clonic convlusions within 2 hours of imipramine administration. These convlusive episodes occurred periodically during the suceeding hour. The cat was ataxic at 24 hours and was sacrificed. Meprobamate, 80 mg./kg., successfully blocked the majority of morphine effects, however, the cats were very excited and ataxic at 24 hours and after this time they were sacrificed. Chlorpromazine, 20 mg./kg., was the most active drug in antagonizing the morphine effects of all the drugs studied. There was no excitement phase associated with the morphine. However, marked ataxia persisted for greater than 24 hours, undoubtedly due either to the high dose of chlorpromazine or to the combined effect.

*Example 6.—Antagonism to LSD-induced effects in cats*

Lysergic acid diethylamide (LSD) is an hallucinogen in man and has been reported to produce comparable activity in cats. The behavioral effects of LSD in cats occur within 30 minutes of an intraperitoneal injection of 100 γ/kg. These effects are consistent in a cat population both in pattern and temporal characteristics and take the form of (1) kangaroo posture, this is a wide base posture of hind legs with tail extended in a dorsally curving arc, (2) hallucinations, manifested by the cat striking out with claws unsheathed after imaginary objects in the air or biting at "things" on the floor of the cage, (3) activity such as walking or washing is periodically arrested by the animal's freezing in a rigid posture and staring blankly, (4) violent head shaking from side to side, (5) alternate shaking of the legs, (6) purring is constant although accompanied by extension of claws or flattening of ears, (7) watery diarrhea, (8) piloerection, and (9) mydriasis.

The potential antagonistic drugs were administered in gelatin capsules 30 minutes prior to the intraperitoneal administration of 100 γ/kg. of LSD. The animals were closely observed for 6 hours and then at 24 hours. Minimally effective antagonistic doses were not established. The effects of the drugs on each of the behavioral effects of LSD described above were noted and were compared with those of chlorpromazine, meprobamate, and imipramine.

2-dimethylaminopyrazine hydrochloride has been found to be the most effective antagonist of LSD of the drugs studied. It blocked all of the effects of LSD with the exception of the purring since this effect is produced by 2-dimethylaminopyrazine hydrochloride, per se.

*Example 7.—Antagonism to termorin-induced effects in cats*

Tremorine administered to cats produces profuse salivation, hissing, profuse and projectile diarrhea, mydriasis, flaccid paralysis, and death. This pattern of drug activity is reproducible and all the potentially antagonistic drugs to be studied are evaluated for activity against each of the tremorine effects.

The drugs under study are administered in gelatin capsules 30 minutes prior to the subcutaneous injection of tremorine. The animals are closely observed for 6 hours and then at 24 hours. The activity of these drugs is compared to that of atropine, imipramine, chlorpromazine, and meprobamate.

2-dimethylaminopyrazine hydrochloride administered at 50 mg./kg. as well as chlorpromazine and imipramine has been found effective in antagonizing the effects of tremorine.

*Example 8.—Behavioral effects in nasty cats*

The purpose of this study is to determine whether 2-dimethylaminopyrazine hydrochloride antagonizes the natural aggression and hostility of nasty cats. Nasty cats are those which cannot be handled except with gloves and a noose on arrival from the vendor. These cats are aggressive, they spit, hiss, attack, bite, scratch, and will strike out at any object introduced into their cages.

The drugs to be studied are administered interperitoneally; the cat is handled on a noose for the injection. The weight of the animal is estimated and the mg./kg. dose is corrected, if necessary, after the animal is sacrificed and weighed.

2-dimethylaminopyrazine hydrochloride administered at 125 mg./kg. successfully lessens the aggressive and hostile behavior of nasty cats.

*Example 9.—Behavioral activity in septal rats*

Electrolytic lesions made in the septal nucleus of the brain of a rat produces marked aggressive behavior characterized by vicious attack of any object introduced into the cage, marked excitement, and exaggerated startle response. These animals are difficult to handle and gloves have to be worn.

The septal lesions are made according to stereotaxic procedures, by placing bipolar stainless steel electrodes in the septum and applying 7 milliamperes of current for 50 seconds, then alternating and repeating the current flow.

2-dimethylaminopyazine hydrochloride administered at 100 mg./kg. produces almost immediate (within 5 minutes) lethargy in the animals. They can be handled without gloves and the degree of struggling is reduced. Within ten minutes the animals can be put into bizarre positions and they show no signs of the aggressive behavior described above.

It is to be understood that the foregoing detailed description is given merely by way of illustration and that many variations may be made therein without departing from the spirit of our invention.

Having described our invention, what we desired to secure by Letters Patent is:

Method for the production of euphoria which comprises administering to warm-blooded mammals an effective amount of a member selected from the group consisting of 2-dimethylaminopyrazine and its nontoxic pharmaceutically acceptable acid addition salts.

References Cited by the Examiner

Chem. Abs., vol. 54, p. 993(b), 1960.

JULIAN S. LEVITT, *Primary Examiner.*

N. G. MANN, *Assistant Examiner.*